(12) United States Patent
Halbach et al.

(10) Patent No.: US 6,296,399 B1
(45) Date of Patent: *Oct. 2, 2001

(54) FIBER OPTIC CONNECTION SYSTEM

(75) Inventors: Paul Gerhard Halbach, Wuppertal (DE); Edward M. Bungo, Cortland; William T. Madden, Solon, both of OH (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,358

(22) Filed: Jul. 2, 1999

(51) Int. Cl.[7] ....................................... G02B 6/38
(52) U.S. Cl. .............................. 385/81; 385/62; 385/139
(58) Field of Search ........................... 385/53–69, 76–94, 385/136–139

(56) References Cited

U.S. PATENT DOCUMENTS

| | | |
|---|---|---|
| 4,687,291 | 8/1987 | Stape et al. . |
| 4,979,792 | 12/1990 | Weber et al. . |
| 4,993,803 | 2/1991 | Suverison et al. . |
| 5,071,219 | 12/1991 | Yurtin . |
| 5,436,995 | * 7/1995 | Yoshizawa et al. .................. 385/86 |

FOREIGN PATENT DOCUMENTS 32 43 309    7/1988   (DE) .

0 848 267 A2    6/1998   (EP) .

* cited by examiner

Primary Examiner—Brian Healy
Assistant Examiner—Michelle R. Connelly-Cushwa
(74) Attorney, Agent, or Firm—Richard A. Jones

(57) ABSTRACT

A fiber optic connection system includes a connector body that has a socket at one end and a wire spring that has parallel retention legs that are spread apart against the self biasing forces of the wire spring. A pair of fiber optic cables are terminated in dovetailed ferrules that have up ramps at a forward end and down ramps at a rearward end. The dovetailed ferrules are inserted into the socket and retained by the parallel retention legs of the wire spring engaging the down ramps. The parallel retention legs engage the up ramps during insertion of the dovetailed ferrules into the socket to spread the parallel retention legs apart against the self biasing forces of the wire spring. The fiber optic connection system includes a ferrule position assurance device that is carried by the connector body for movement between a pre-stage position and a final position. The ferrule position assurance device allows the parallel retention legs to spread apart in the pre-stage position and prevents the parallel retention legs from being spread apart in the final position. The fiber optic connector system includes a strain relief handle that is attached to the dovetailed ferrules to provide a handle and a strain relief The fiber optic connector system has a chamber at an opposite end that receives a retainer and a pair of electro-optic devices. A modified fiber optic connector system has a second socket at an opposite end that receives a second pair of fiber optic cables that are terminated by dovetailed ferrules that are plugged into the second socket.

10 Claims, 10 Drawing Sheets

FIBER OPTIC CONNECTION SYSTEM

FIELD OF THE INVENTION

This invention relates to fiber optics and more particularly to a fiber optic connection system.

BACKGROUND OF THE INVENTION

U.S. Pat. No. 4,687,291 granted to William J. Stape et al Aug. 18, 1987 discloses a duplex fiber optic connector that enables mating the fibers of a multi-fiber optic cable with like fibers of a second fiber optic cable or cables. The duplex fiber optic connector comprises a duplex cable connector that plugs into one end of an interconnect member (connector body) that receives a pair of single cable connectors that are plugged into the opposite end. Each connector carries the fibers of a respective cable in individual ferrules. The duplex cable connector includes hermaphroditic covers that snap together to provide a housing for the individual ferrules of the two fiber optic cables at one end. The housing provided by the assembled covers is plugged into the interconnect member with the two ferrules housed inside. The duplex connector is retained in the interconnect receptacle by integral latch arms of the hermaphroditic covers.

Each of the single cable connectors that are plugged into the opposite end of the interconnect member each include hermaphroditic covers that form a housing. Each of the ferrules are plugged into the opposite end of the interconnect member individually and retained by integral latch arms of the hermaphroditic covers. This arrangement results in the need for large receptacles and a large interconnect member because the assembled covers are plugged into the interconnect member. Moreover, the arrangement does not provide any assurance that the ferrules or housings formed by the assembled covers are properly connected to the interconnect member.

U.S. Pat. No. 4,979,792 granted to Robert N. Weber et al Dec. 25, 1990 discloses a duplex fiber optic connector similar to the duplex fiber optic cable connector disclosed in the Stape '291 patent discussed above. This duplex fiber optic connector further includes a cover. However, the connector has the same drawbacks noted above.

U.S. Pat. No. 4,993,803 granted to Lyle B Suverison et al Feb. 19, 1991 and U.S. Pat. No. 5,071,219 granted to John A. Yurtin Dec. 10, 1991 both disclose electro-optical header connectors that makes optical connections between the fiber optic cables of a plug connector and electro-optical (EO) devices housed in the header connector. These arrangements also have housings for the ferrules that must be accommodated by interconnect member or header connectors.

German Patent DE 32 43 309 discloses an electro-optical header connector that makes an optical connection between the a fiber optic cable and an electro-optical (EO) device housed in the header connector. A ferrule is attached to the end of the fiber optic cable. The ferrule is plugged directly into the header connector. However, this arrangement does not accommodate more than a single fiber optic cable.

SUMMARY OF THE INVENTION

The object of this invention is to provide a fiber optic connection system that is compact and that is capable of accommodating a plurality of fiber optic cables.

A feature of the fiber optic connection system of the invention is that the connection system has a connector body that incorporates a spring wire that locks an optical connector in place in the connector body.

Another feature of the fiber optic connection system of the invention is that the connection system has a connector body that incorporates a spring wire that engages a down ramp of an optical connector to lock the optical connector in place and to bias the optic fiber of the optical connector forward into functional engagement with another optic fiber or an electro-optic device.

Still another feature of the fiber optic connection system of the invention is that the connection system includes a ferrule position assurance (FPA) device to insure that the ferrule of the optic connector is properly locked in place in the connector body.

Yet another feature of the fiber optic connection system of the invention is that the connection system includes a FPA that is attached to the connector body in a pre-staged position that allows the spring wire to expand during optical connector insertion.

Still yet another feature of the fiber optic connection system of the invention is that the connection system includes a FPA that is moveably attached to the connector for movement to a final position where the FPA holds down the spring wire to retain an optic connector positively.

Still yet another feature of the fiber optic connection system of the invention is that the fiber optic connection system has a plurality of ferrules that are dovetailed together and plugged directly into the connector body to conserve space.

Still yet another feature of the fiber optic connection system of the invention is that the connection system includes a handle that is attached to the rearward ends of the dovetailed ferrules to facilitate insertion of the dovetailed ferrules into the connector body and to provide a strain relief without any need for increasing the size of the connector body.

These and other objects, features and advantages of the fiber optic connection system of the invention will become apparent in connection with the detailed description of the fiber optic connection system of the invention below.

DETAILED DESCRIPTION OF PREFERRED EMBODIMENT

Figure 1:
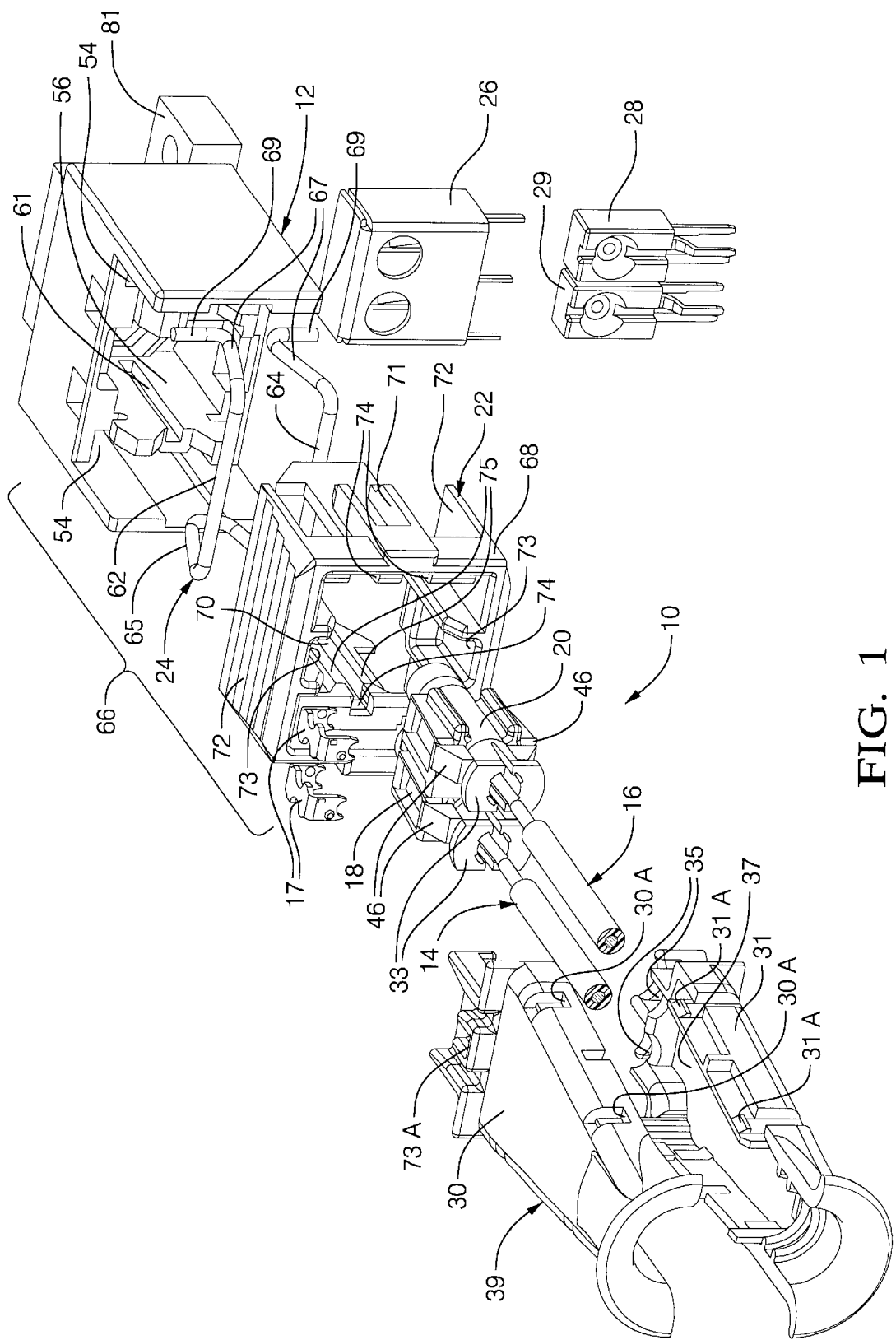
FIG. 1 is an exploded perspective view of a fiber optic connection system of the invention.

Referring first to FIG. 1, a fiber optic connection system 10 of the invention is shown in an exploded perspective view. Fiber optic connection system 10 comprises a connector body or header 12, a pair of fiber optic cables 14 and 16 that are terminated by retainers 17 in ferrules 18 and 20 respectively, a ferrule position assurance (FPA) device 22, a wire spring 24, a retainer 26, a pair of electro-optic (EO) devices 28 and 29 and a strain relief handle 39.

Figure 2:
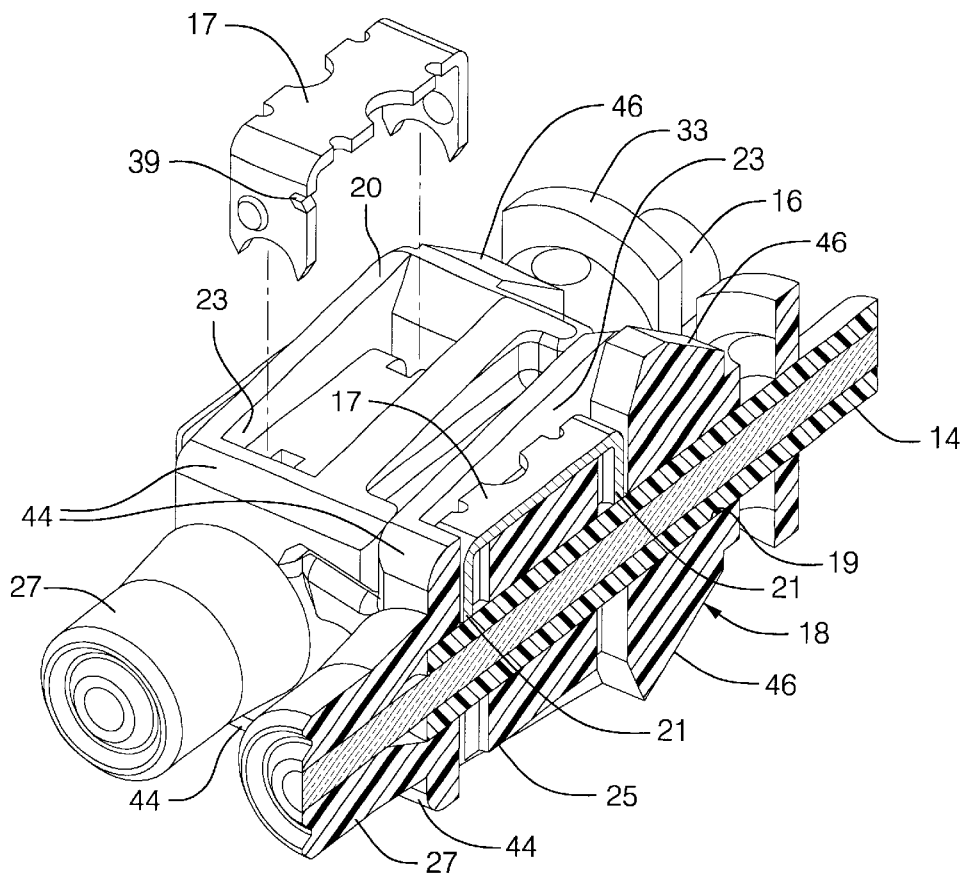
FIG. 2 is a sectioned perspective view of the dove-tailed ferrules attached to the fiber optic cables that are shown in FIG. 1.

FIG. 2 is a sectioned, perspective view of the fiber optic cables 14 and 16, the retainers 17 and the ferrules 18 and 20 shown in FIG. 1. A cable passage 19 extends through each ferrule 18, 20 in an axial or longitudinal direction. Each ferrule 18, 20 also has two axially spaced slots 21 that extend through the ferrule in a transverse direction and intersect cable passage 19. Slots 21 open into upper and lower recesses 23 and 25 in the ferrule.

Cable 14 is attached to ferrule 18 as shown in section in FIG. 2. First an end portion of the cable jacket is stripped away to provide a bare core end. The stripped end of cable 14 is then inserted into cable passage 19 until the end face of the bare core end reaches the end face of tip 27. The legs of the U-shaped metal retainer 17 are then pushed into slots 21 until the body of retainer 17 bottoms out in upper recess 23 and the free ends of the legs bite into the jacket of cable 14 to hold fiber optic cable 14 in place. Metal retainer 17 has a barb 59 in each leg (one shown) that digs into ferrule 18 to hold retainer 17 in the retaining position. Optic cable 16 is terminated by an identical retainer 17 in ferrule 20 in an identical manner.

Figure 3:
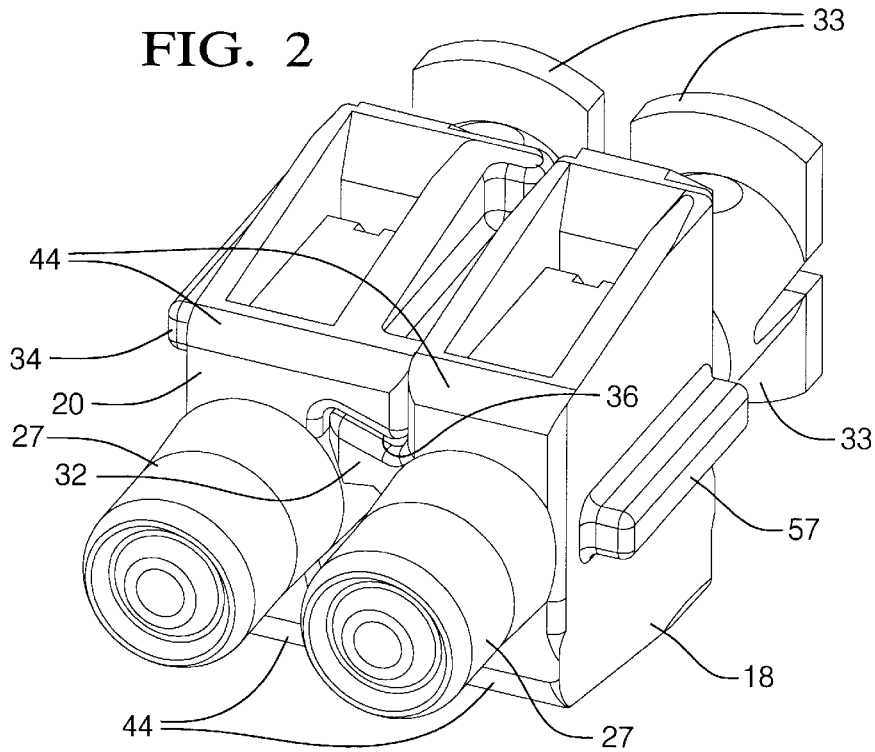
FIG. 3 is a perspective view of the dove-tailed ferrules that are shown in FIGS. 1 and 2.
Figure 4:
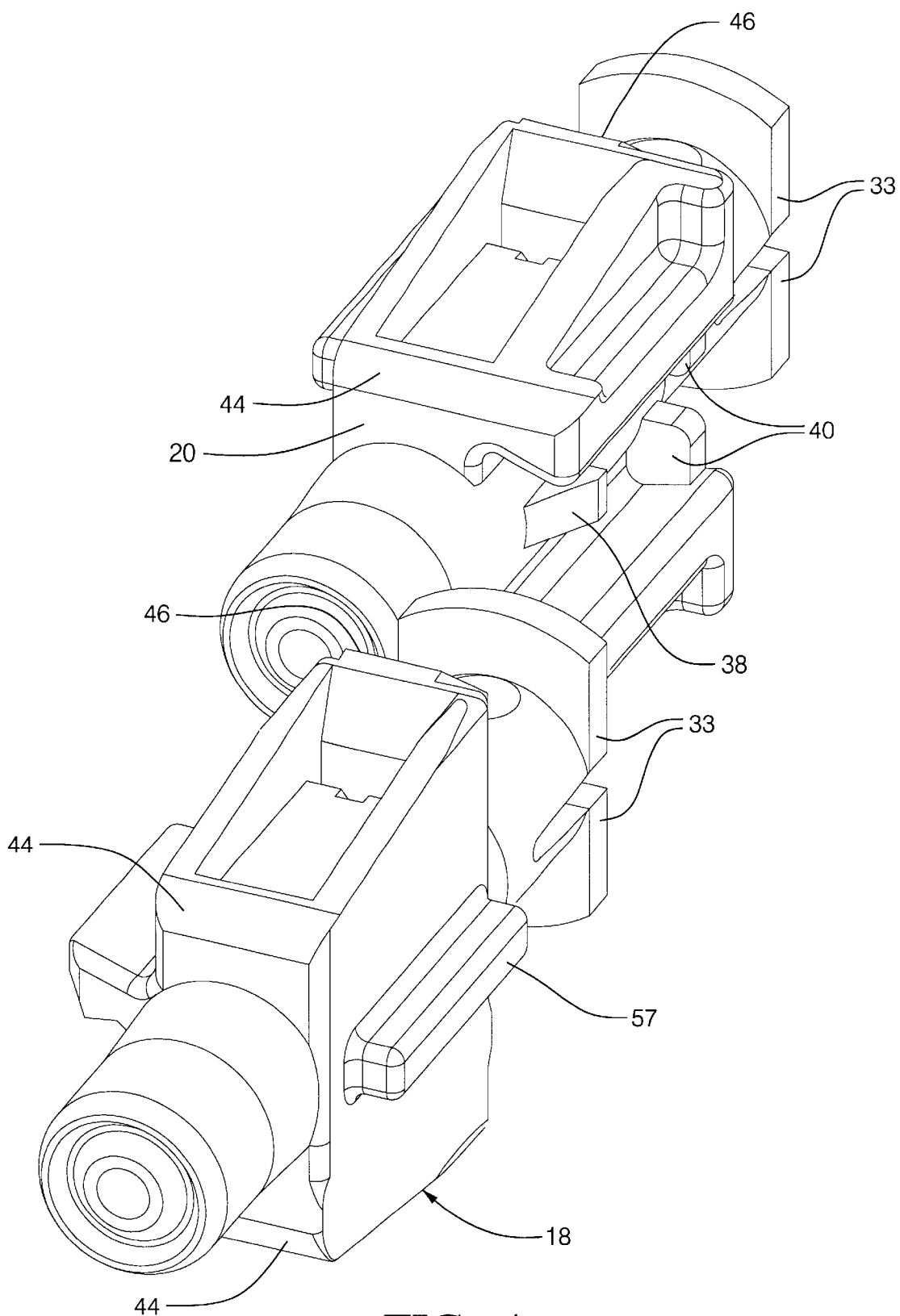
FIG. 4 is an exploded view of the ferrules shown in FIG. 3.
Figure 5:
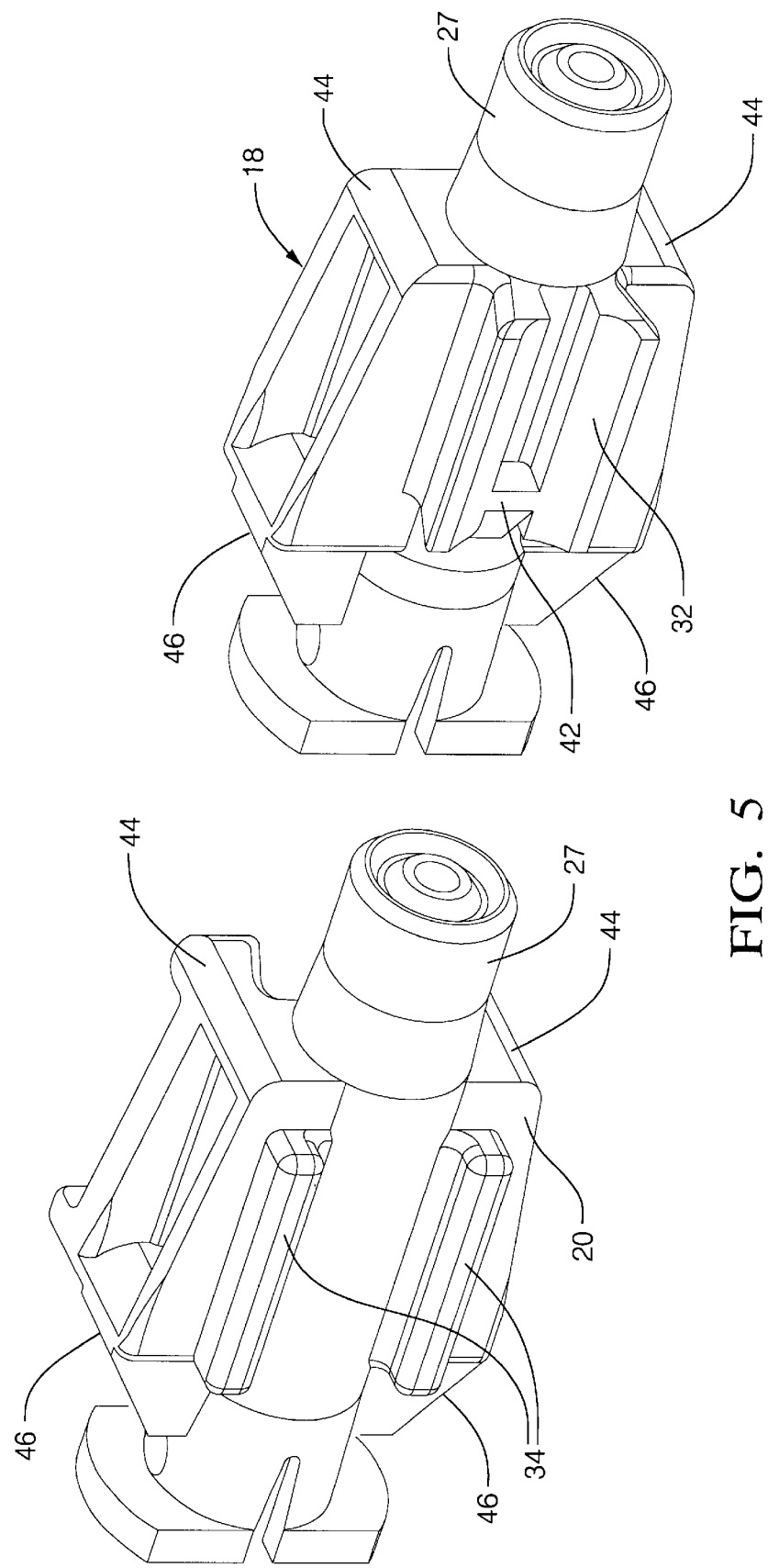
FIG. 5 is another exploded view of the complementary ferrules shown in FIG. 3.

Ferrules 18 and 20 are complementary as best shown in FIGS. 3, 4 and 5. Ferrule 18 has an index tab 57 on an outer side wall and a dovetail projection 32 on an opposite inner side wall. On the other hand ferrule 20 has spaced index tabs 34 on an outer side wall and a dovetail slot 36 on an opposite inner side wall. Dovetail projection 32 slides into dovetail slot 36 so that ferrules 18 and 20 are dovetailed together as shown in FIG. 3. One ferrule is preferably a transmitting ferrule and the other a receiving ferrule. Ferrules 18 and 20 are also preferably color coded. For instance ferrule 18 may be a transmitting ferrule molded of white plastic while ferrule 20 is a receiving ferrule molded of black plastic.

Ferrule 20 has a lock nib 38 and two stop shoulders 40 in dovetail slot 36 as best shown in FIG. 4. Dovetail projection 32 of ferrule 18 has a longitudinal groove that contains a lock wall 42 as best shown in FIG. 5. Lock wall 42 snaps behind lock nib 38 when dovetail projection 32 is slid into dovetail slot 36 and into abutting engagement with stop shoulders 40 to hold ferrules 18 and 20 together in the longitudinal direction as shown in FIG. 3. Each ferrule 18, 20 has upper and lower up ramps 44 at a forward end and upper and lower down ramps 46 at a rearward end that cooperate with wire spring 24 as explained below.

Figure 8:
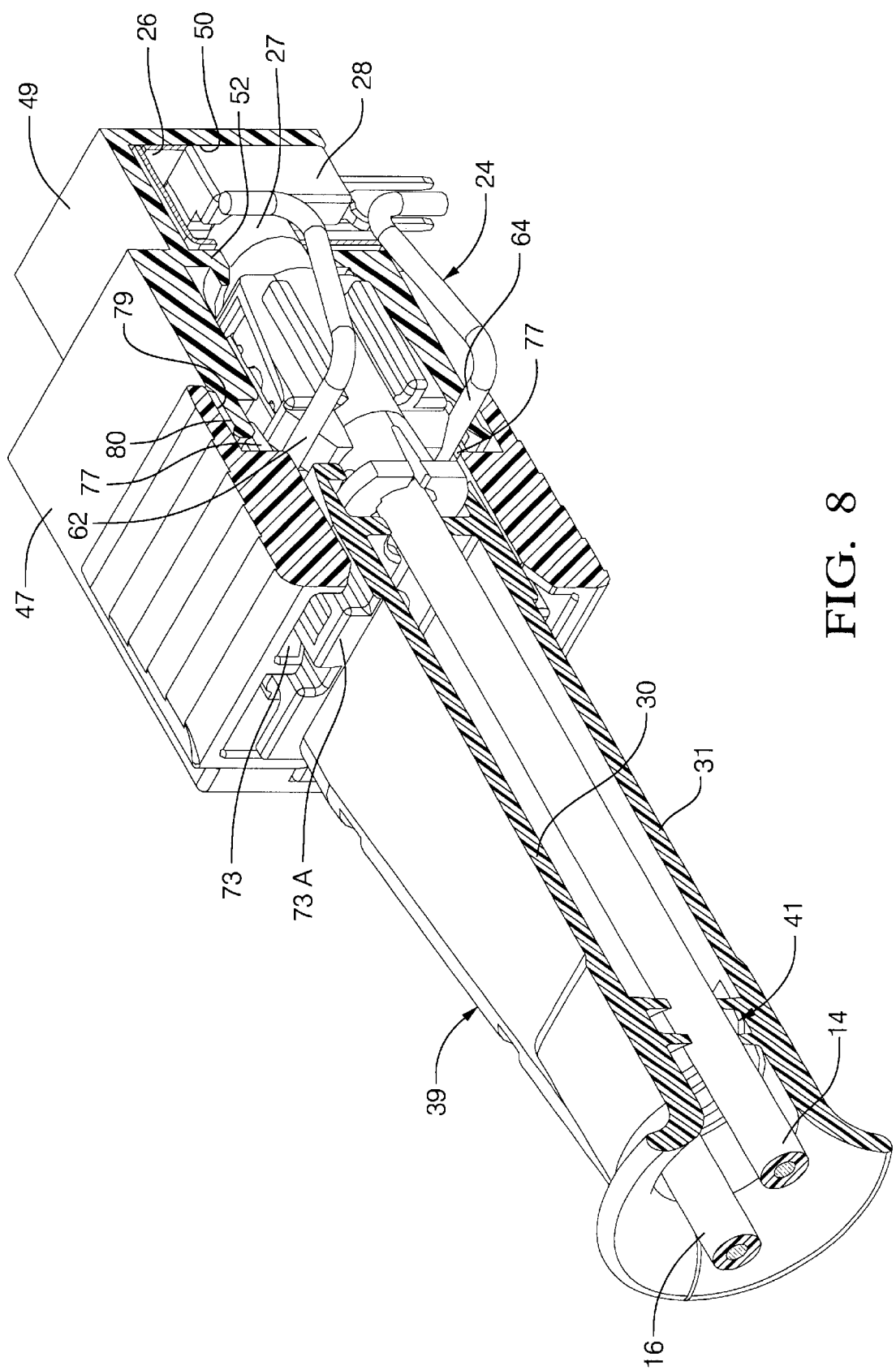
FIG. 8 is a sectioned perspective view of the fiber optic connection system shown in FIG. 1.
Figure 9:
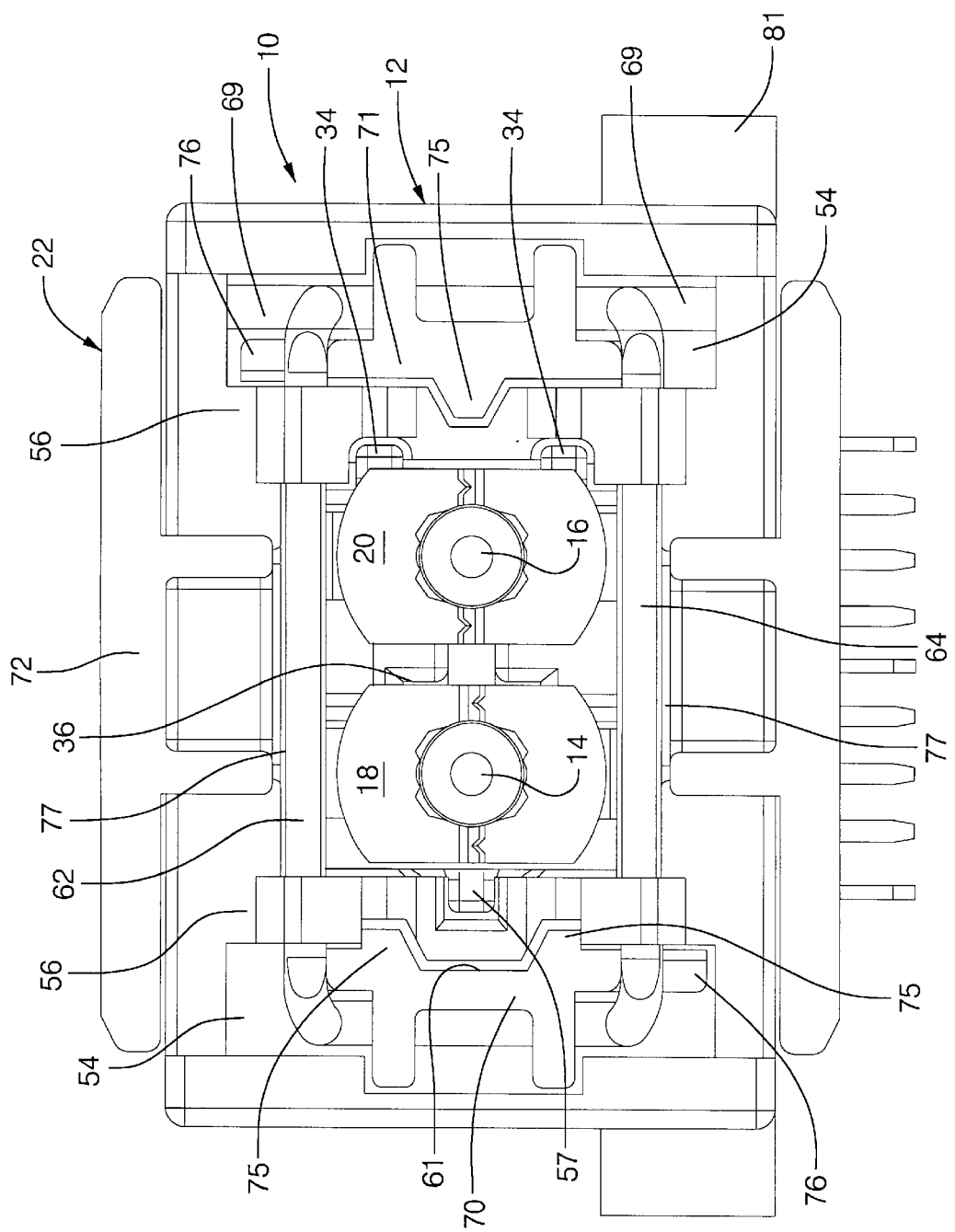
FIG. 9 is a section taken substantially along the line 9—9 of FIG. 10 looking in the direction of the arrows.

After fiber optic cables 14 and 16 are terminated in ferrules 18 and 20 by retainers 17, ferrules 18 and 20 are dove-tailed together as shown in FIG. 2. Strain relief handle 39 is then attached by locking the strain relief shells 30 and 31 shown in FIG. 1 together with four integral latch nibs 31a of lower shell 31 engaging four detents 30a of upper shell 30 to trap flanges 33 at the rear ends of ferrules 18 and 20 in chambers 35 and the emerging portions of cables 14 and 16 in chamber 37 behind them. Thus when shells 30 and 31 are locked together, the handle 39 formed by the shells is attached to dovetailed ferrules 18 and 20 and also grips cables 14 and 16 at exit bell 41 to provide a strain relief for the cables as best shown in FIG. 8. Handle 39 provides a convenient means for plugging dove-tailed ferrules 18 and 20 into header 12.

Referring now to FIGS. 6, 7, 8 and 9, header 12 has an enlarged rearward end 47 that includes a socket 48 for receiving the dovetailed ferrules 18 and 20 and a reduced forward end 49 that has a chamber 50 for receiving retainer 26 and the EO devices 28 and 30 inside the retainer. Socket 48 and chamber 50 are separated by an internal portion of lateral wall 52 of header 12 that has two ports for the tips 27 of ferrules 18 and 20 to pass through and engage EO devices 28 and 29 as best shown in FIG. 8.

Figure 6:
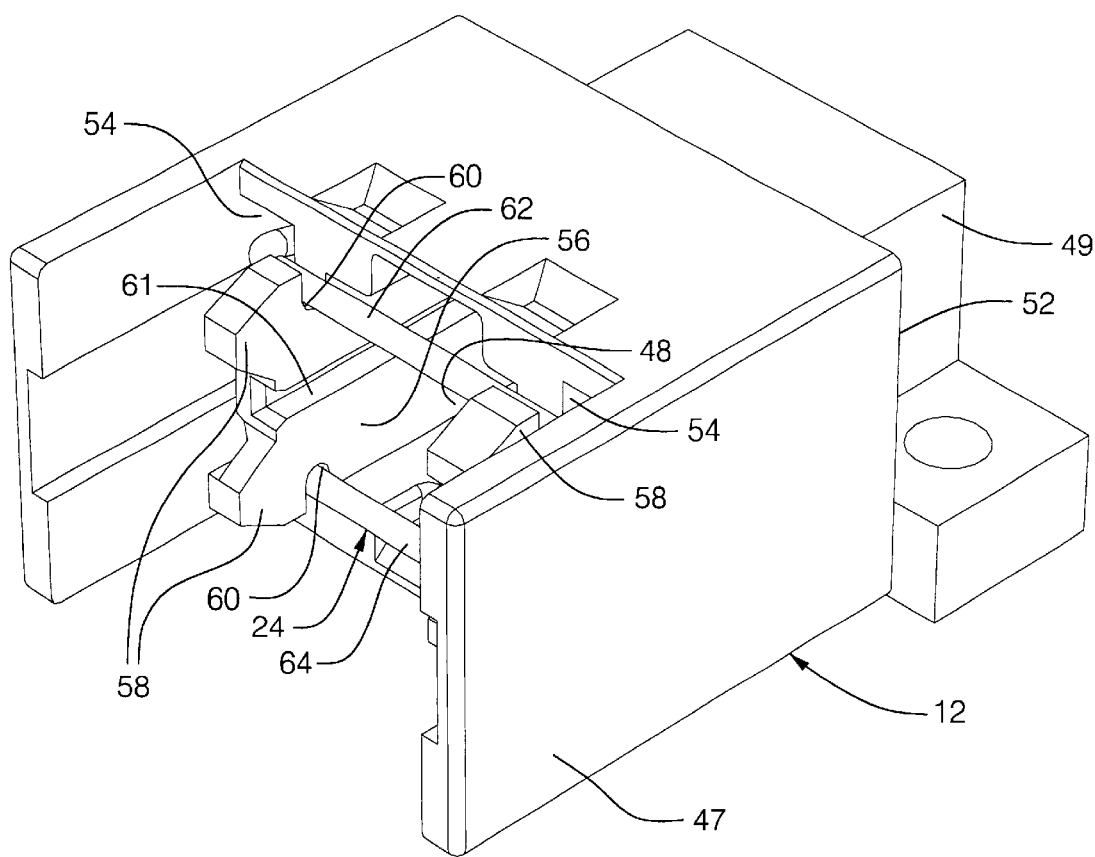
FIG. 6 is a perspective view of the spring wire installed in the header of FIG. 1 to form a subassembly.

The rearward end of header 12 has vertical slots 54 on each side of socket 48 that are separated from socket 48 by two internal partition walls 56—one on each side of socket 48. Partition walls 56 each have a rearward projection 58, that has upper and lower grooves 60 for supporting spring wire 24 as best shown in FIG. 6. The left hand partition wall 56 as viewed in FIG. 6 has an indexing slot 61 on the inside for index tab 57 of ferrule 18. Indexing slot is between two indexing slots (not shown) on the outside of left hand partition wall 56 for receiving indexing ribs of FPA device 22 as explained below. The right hand partition wall 56 has two indexing slots 61 (not shown) on the inside for index tabs 34 of ferrule 20 and a single indexing slot on the outside for receiving an index rib of FPA device 22.

Spring wire 24 is a continuous wire that is bent to provide upper and lower spring legs 62 and 64. Spring legs 62 and 64 are joined at one end by an acute angle or V-shaped spring portion 65 as best shown in FIG. 1. The opposite ends of spring legs 62 and 64 have separate spring portions 67 that converge toward each other and then terminate with upright tabs 69 that extend away from each other. V-shaped spring portion 65 fits into the vertical slot 54 on the left side of socket 48. Spring portions 67 and 69 fit into the vertical slot 54 on the right side of socket 48 and engage the top and bottom of the slot so that the outer ends of spring legs 62 and 64 are biased into the bottoms of grooves 60 as best shown in FIG. 6. Spring wire 24 is attached to header 12 to form part of a subassembly 66 shown in FIG. 7.

Figure 7:
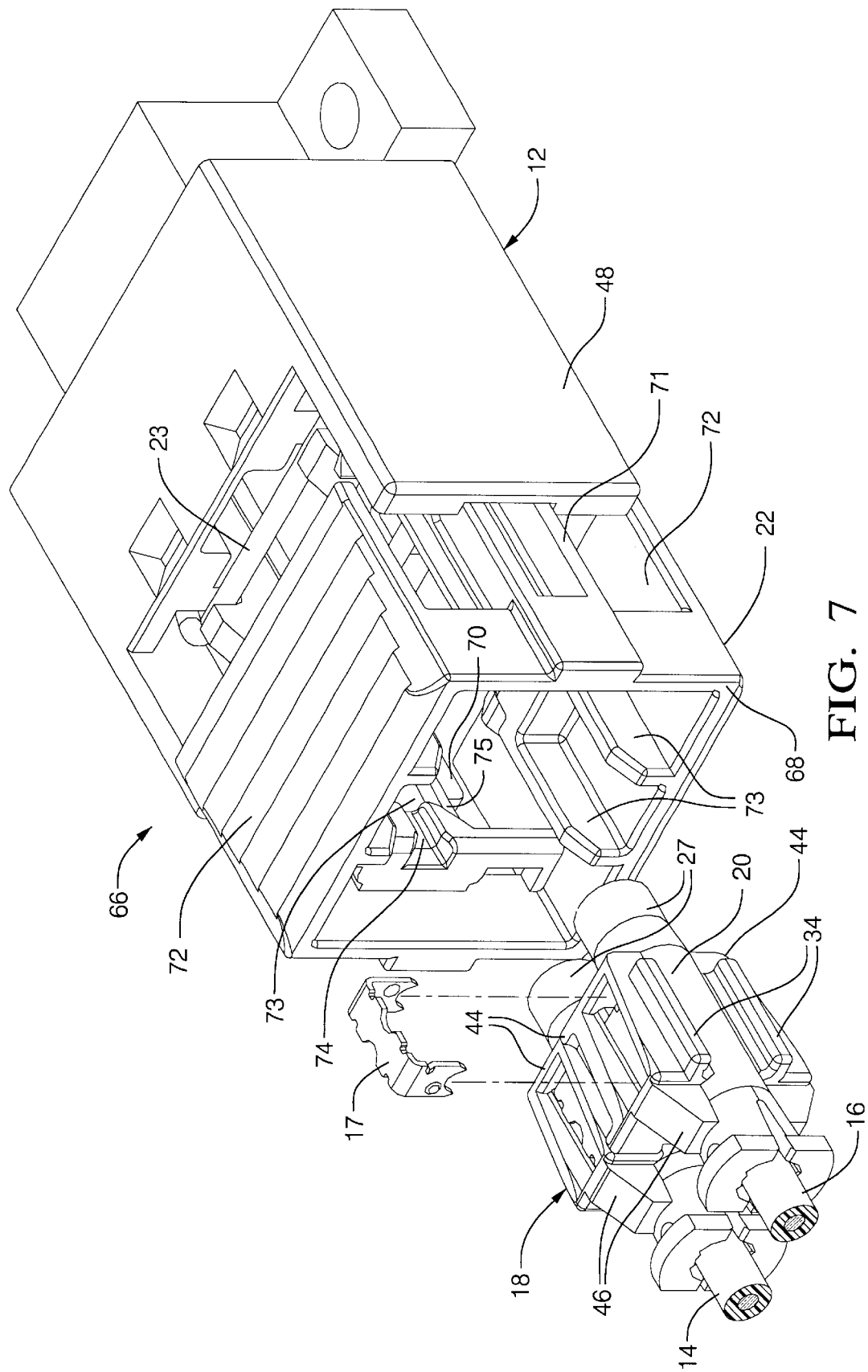
FIG. 7 is a perspective view of the FPA of FIG. 1 attached to the subassembly of FIG. 6 in a pre-staged position.

Referring now to FIG. 7, subassembly 66 further includes FPA device 22. FPA device 22 has a face frame 68, two side wings 70, 71 and upper and lower walls 72 that extend rearwardly from the face frame 68. The inner surface of wing 70 has a short indexing slot 74 for receiving index tab 57 of ferrule 18 and then two indexing ribs 75 that engage indexing slots on the outside of left hand partition wall 56. The inner surface of wing 71 has two short indexing slots 74 for receiving index tabs 34 of ferrule 20 and then a single indexing rib 75 that engages an indexing slot on the outside of right hand partition wall 56. Wings 70, 71 each have forward and rearward tabs 76 (FIG. 1) for engaging spring legs 62 and 64 at one end.

Upper and lower walls 72 each have a slot 73 that receives respective index tabs 73a of strain relief shells 30 and 31 to locate handle 39 as best shown in FIG. 8. Walls 72 each also have a forward lock tab 77 ahead of slot 73 for holding spring leg 62 or 64 down when FPA device 22 is pushed home to its final position. FPA device 22 is attached to subassembly 66 by inserting wings 70, 71 into respective slots 54 of header 12 so that wings 70, 71 are outside and adjacent to respective internal partition walls 56. FPA device 22 is then pushed into header 12 until spring legs 62 and 64 of wire spring 24 snap over forward tabs 76 of wings 70, 71 and engage the rearward tabs 76. FPA device 22 is now attached to header 12 in a pre-staged position and part of subassembly 66 as shown in FIG. 7.

Dovetailed ferrules 18 and 20 are connected to header 12 by inserting the dovetailed ferrules 18 and 20 at the end of handle 39 into socket 48 of header 12 through face frame 68 of FPA device 22. Handle 39 is not shown in FIG. 7 for clarity. During insertion index tabs 57 and 34 of the dovetailed ferrules 18 and 20 pass through the short indexing slots 74 of wings 70, 71 and then into the elongated indexing slots 61 of partition walls 56 to guide the dovetailed ferrules 18 and 20 into position within socket 48. As the dovetailed ferrules 18 and 20 slide into socket 48, up ramps 44 at the forward ends of the ferrules spread upper and lower spring legs 62 and 64 apart. As ferrules 18 and 20 approach the internal portion of lateral wall 52 of header 12, spring legs 62 and 64 engage down ramps 46 and squeeze toward one another under the bias of spring portions 65, 67 and 69. This spring action locks the ferrules 18 and 20 in socket 48. Moreover the force of the spring legs 62 and 64 on down ramps 46 produces an axial force that pushes the tip 27 of ferrules 18 and 20 forwardly against the EO devices 28 and 29 in chamber 50.

The FPA device 22 is then pushed into the socket 48 to the final position shown in FIG. 8. In this home or final position, spring legs 62 and 64 are held against down ramps 46 in a positive manner by the forward lock tabs 77 of upper and lower walls 72. FPA 22 is held in the final position by detents 79 at the forward ends of walls 72 engaging depressions 80 in the rearward end of header 12 as best shown in FIG. 8. Header 12 is normally attached to a circuit board (not shown) which carries the EO devices 28 and 29 inside retainer 26. Retainer 26 is received in chamber 50 of header 12 when header 12 is attached to the circuit board via attachment flange 81. Header 12 is preferably attached to the circuit board before the dove-tailed ferrules 18 and 20 are plugged in. However, ferrules 18 and 20 can be plugged in first.

Header 12 contains the retainer 26 with two EO devices 28, 29 on one side of the internal portion of wall 52 and the wire spring 24 and the FPA device 22 on the other side. The dove tailed ferrules 18, 20 deflect wire spring 24 during the mating process. In the final position, wire spring 24 locks the dove-tailed ferrules 18, 20 on down ramps 46 which are preferably about 45°. Down ramps 46 provide an additional axial force to adjust the ferrules 18, 20 to the EO devices 28, 30. The FPA device 22 allows the wire spring 24 to move in the pre-staged position. In the final position after the FPA device 22 is pushed home, two lock tabs 77 keep the wire spring 24 in place to maintain the retention force on the dove-tailed ferrules 18 and 20.

Figure 10:
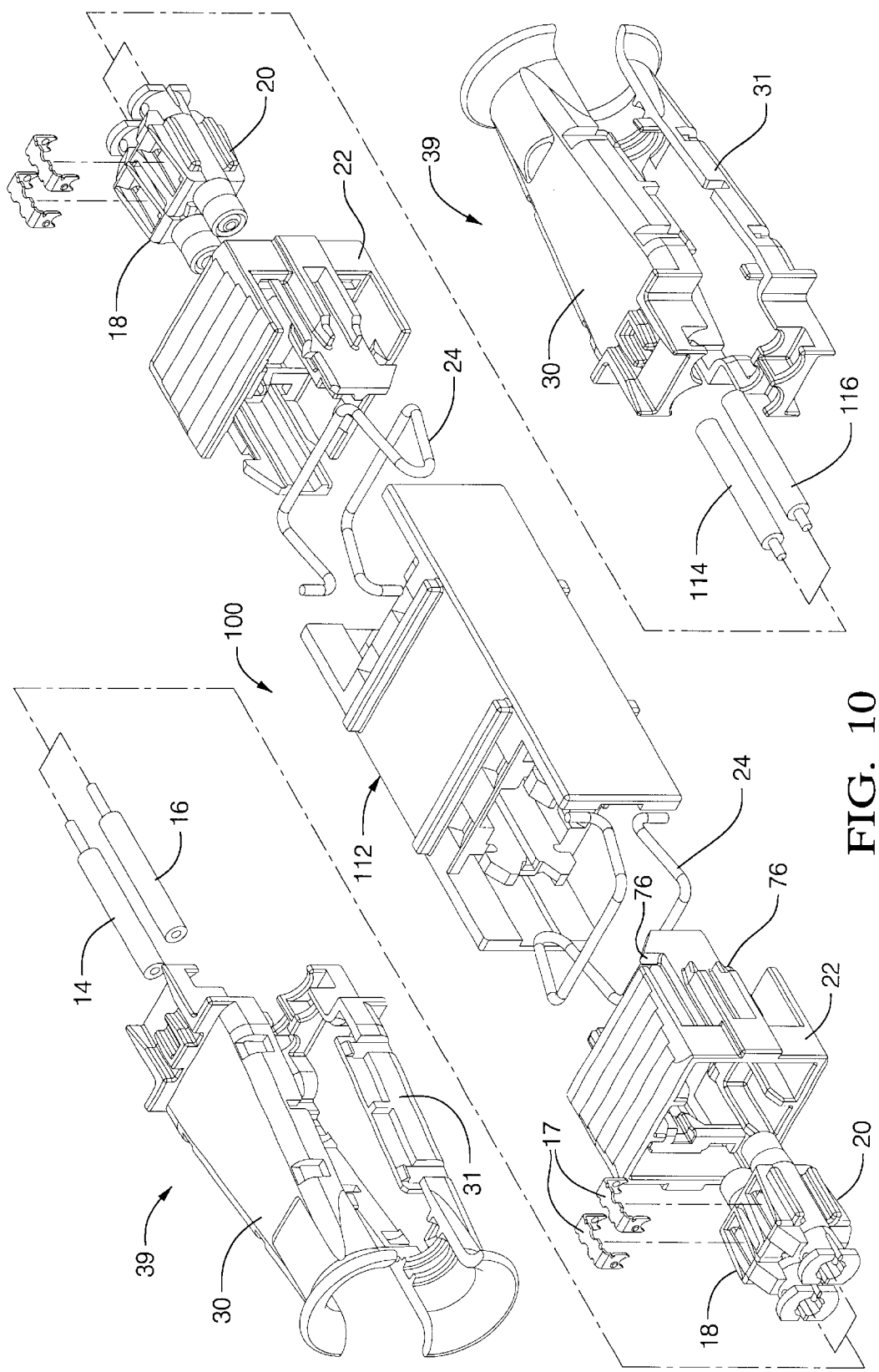
FIG. 10 is an exploded perspective view of another fiber optic connection system of the invention.
Figure 11:
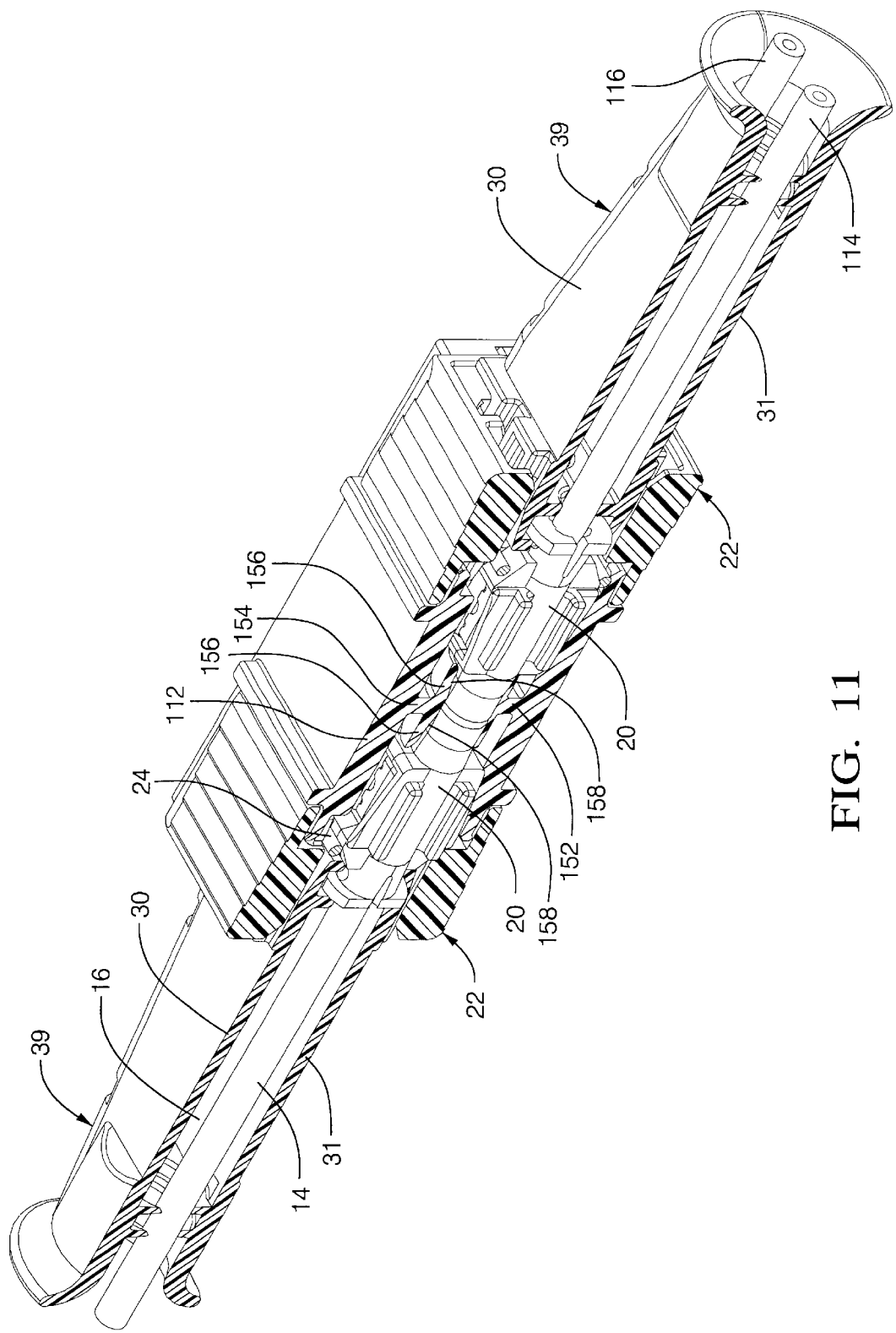
FIG. 11 is a sectioned perspective view of the fiber optic connection system shown in FIG. 9.

FIG. 10 is an exploded perspective view of another fiber optic connection system 100 of the invention. This is an inline connection system where the two fiber optic cables 14 and 16 are connected to two other fiber optic cables 114 and 116 rather than to two EO devices as in the case of the fiber optic connection system 10 shown in FIGS. 1–8. The header 12 of connection system 10 is replaced by an inline connector 112 with sockets and lock features (as described above) on both sides of an internal wall 152 that has an alignment feature for the connection of two optical connectors. More specifically internal wall 152 has two laterally spaced ports 154 (one shown) each of which has bosses 156 on each side. Bosses 156 have bores 158 that taper inwardly toward each other as best shown in FIG. 11.

The fiber optic cables 14 and 16 of both systems are terminated in ferrules 18 and 20 by retainers 17 in an identical manner and these ferrules are dove-tailed together in the same way. An identical handle 39 comprising shells 30 and 31 is attached to the dove-tailed ferrules 18 and 20 as described above and the dovetailed ferrules 18 and 20 are inserted through an identical FPA device 22 into the socket at the left hand end of in-line connector 112 which is identical with the left hand end of header 12. Ferrules 18 and 20 are retained by an identical spring 22 which is locked in place when FPA device 22 is pushed home to its final position.

The right hand components and the right hand side of in-line connector 112 duplicate the left hand side of both systems.

The two fiber optic connection systems described above are duplex systems where two fiber optic cables are connected to two electro-optic devices or to two fiber optic cables. However, in some aspects, the invention applies to simplex systems where a single fiber optic cable is connected to one electro-optic device or one fiber optic cable. Moreover in other aspects the invention applies to multiplex systems where a larger plurality of fiber optic cables, three or more, are connected to a larger plurality of electro-optic devices and/or fiber optic cables.

In other words, many modifications and variations of the present invention in light of the above teachings may be made. It is, therefore, to be understood that, within the scope of the appended claims, the invention may be practiced otherwise than as specifically described.

We claim:

1. A fiber optic connection system comprising:

a connector body having a socket at one end, a wire spring carried by the connector body, the wire spring having parallel retention legs that are spread apart against self biasing forces of the wire spring, a fiber optic cable that is terminated in a ferrule that has an up ramp at a forward end and a down ramp at a rearward end, the ferrule being disposed in the socket with one of the parallel retention legs engaging the down ramp to retain the ferrule in the socket and bias the ferrule in a forward direction in the socket, and the one of the parallel retention legs engaging the up ramp during insertion of the ferrule into the socket to spread the parallel retention legs apart against the self biasing forces of the wire spring.

2. A fiber optic connection system comprising:

a connector body having a socket at one end, a wire spring carried by the connector body, the wire spring having parallel retention legs that are spread apart against self biasing forces of the wire spring, a fiber optic cable that is terminated in a ferrule that has an up ramp at a forward end and a down ramp at a rearward end, the ferrule being disposed in the socket with one of the parallel retention legs engaging the down ramp to retain the ferrule in the socket, the one of the parallel retention legs engaging the up ramp during insertion of the ferrule into the socket to spread the parallel retention legs apart against the self biasing forces of the wire spring, and a ferrule position assurance device that is carried by the connector body for movement between a pre-stage position and a final position, the ferrule position assurance device allowing the parallel retention legs to spread apart in the pre-stage position and preventing the parallel retention legs from being spread apart in the final position.

3. A fiber optic connection system comprising:

a connector body having a socket at one end, a wire spring carried by the connector body, the wire spring having parallel retention legs that are spread apart against self biasing forces of the wire spring, a pair of fiber optic cables that are terminated in respective ferrules that have an up ramp at a forward end and a down ramp at a rearward end, and the ferrules being disposed in the socket side by side with one of the parallel retention legs engaging the down ramps to retain the ferrules in the socket and bias the ferrules in a forward direction in the socket, and the one of the parallel retention legs engaging the up ramps during insertion of the ferrules into the socket to spread the parallel retention legs apart against self biasing forces of the wire spring.

4. A fiber optic connection system comprising:

a connector body having a socket at one end, a wire spring carried by the connector body, the wire spring having parallel retention legs that are spread apart against self biasing forces of the wire spring, a pair of fiber optic cables that are terminated in respective ferrules that have an up ramp at a forward end and a down ramp at a rearward end, and the ferrules being disposed in the socket side by side with one of the parallel retention legs engaging the down ramps to retain the ferrules in the socket, and the one of the parallel retention legs engaging the up ramps during insertion of the ferrules into the socket to spread the parallel retention legs apart against the self biasing forces of the wire spring, and a ferrule position assurance device that is carried by the connector body for movement between a pre-stage position and a final position, the ferrule position assurance device allowing the parallel retention legs to spread apart in the pre-stage position and preventing the parallel retention legs from being spread apart in the final position.

5. A fiber optic connection system comprising:

a connector body having a socket at one end, a wire spring carried by the connector body, the wire spring having parallel retention legs that are spread apart against self biasing forces of the wire spring, a pair of fiber optic cables that are terminated in respective ferrules that have an up ramp at a forward end and a down ramp at a rearward end, the ferrules being disposed in the socket side by side with one of the parallel retention legs engaging the down ramps to retain the ferrules in the socket, and the one of the parallel retention legs engaging the up ramps during insertion of the ferrules into the socket to spread the parallel retention legs apart against the self biasing forces of the wire spring, and the ferrules being dovetailed together.

6. The fiber optic connection system as defined in claim 5 further including a strain relief handle that is attached to rearward ends of the ferrules to provide a handle and a strain relief.

7. The fiber optic connection system as defined in claim 6 wherein the strain relief handle comprises two shells that are attached to each other.

8. The fiber optic connection system as defined in claim 6 further including a ferrule position assurance device that is carried by the connector body for movement between a prestage position and a final position, the ferrule position assurance device allowing the parallel retention legs to spread apart in the pre-stage position and preventing the parallel retention legs from being spread apart in the final position.

9. The fiber optic connection system as defined in claim 8 wherein the connector body has a chamber at an opposite end and the fiber optic connector system further includes a retainer and a pair of electro-optic devices that are disposed in the chamber.

10. The fiber optic connection system as defined in claim 8 wherein the connector body has a second socket at an opposite end and the fiber optic connector system further includes a second pair of fiber optic cables that are terminated by dovetailed ferrules that are plugged into the second socket.

* * * * *